2 Sheets—Sheet 1.

S. D. KING,

Assignor, by mesne assignments, to J. B. SMITH and A. L. KING.

DUMPING CAR.

No. 10,215. Reissued Oct. 10, 1882.

Attest:

Walter Donaldson

David H. Mead

Inventor,

Sidney D. King

By

Ellis Spear

Atty.

2 Sheets—Sheet 2.

S. D. KING,

Assignor, by mesne assignments, to J. B. SMITH and A. L. KING.

DUMPING CAR.

No. 10,215. Reissued Oct. 10, 1882.

Attest:
Walter Trualdson
David H. Mead

Inventor
Sidney D. King
by Ellis Spear
Atty.

UNITED STATES PATENT OFFICE.

SIDNEY D. KING, OF PITTSTON, ASSIGNOR, BY MESNE ASSIGNMENTS, TO JOHN B. SMITH, OF DUNMORE, AND ANTOINETTE L. KING, OF WEST PITTSTON, PENNSYLVANIA.

DUMPING-CAR.

SPECIFICATION forming part of Reissued Letters Patent No. 10,215, dated October 10, 1882.

Original No. 221,577, dated November 11, 1879. Application for reissue filed July 24, 1882.

DIVISION A.

*To all whom it may concern:*

Be it known that I, SIDNEY D. KING, of Pittston, in the county of Luzerne and State of Pennsylvania, have invented certain new and useful Improvements in Cars; and I do hereby declare that the following is a full, clear, and exact description of the invention, which will enable others skilled in the art to which it appertains to make and use the same.

The nature of my invention consists in the construction and arrangement of a dumping-car and of a brake specially adapted thereto, as will be hereinafter more fully set forth.

Figure 1:
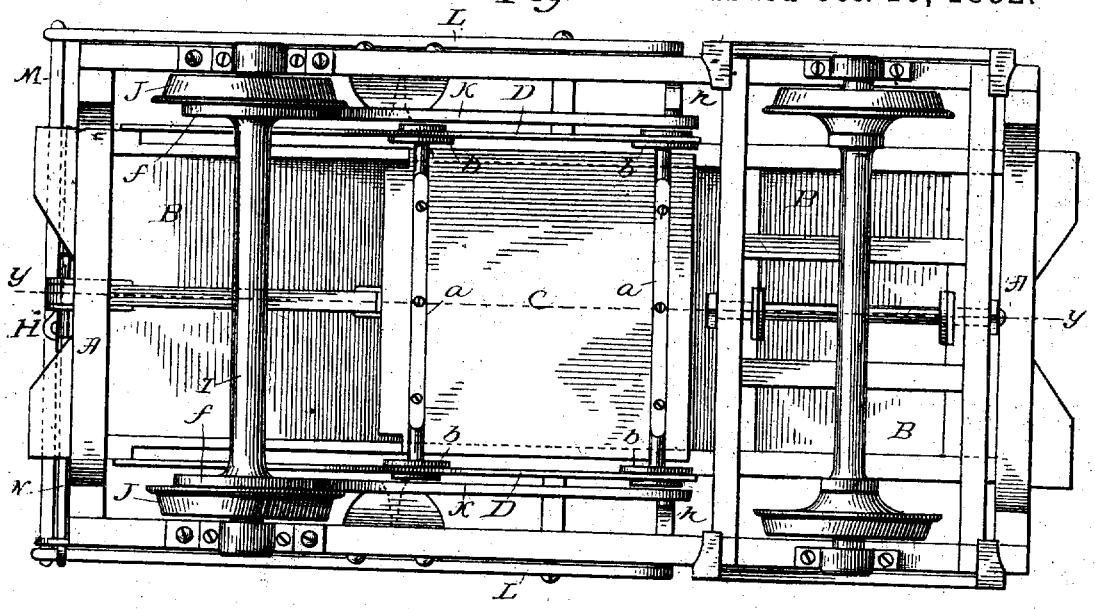
Figure 2:
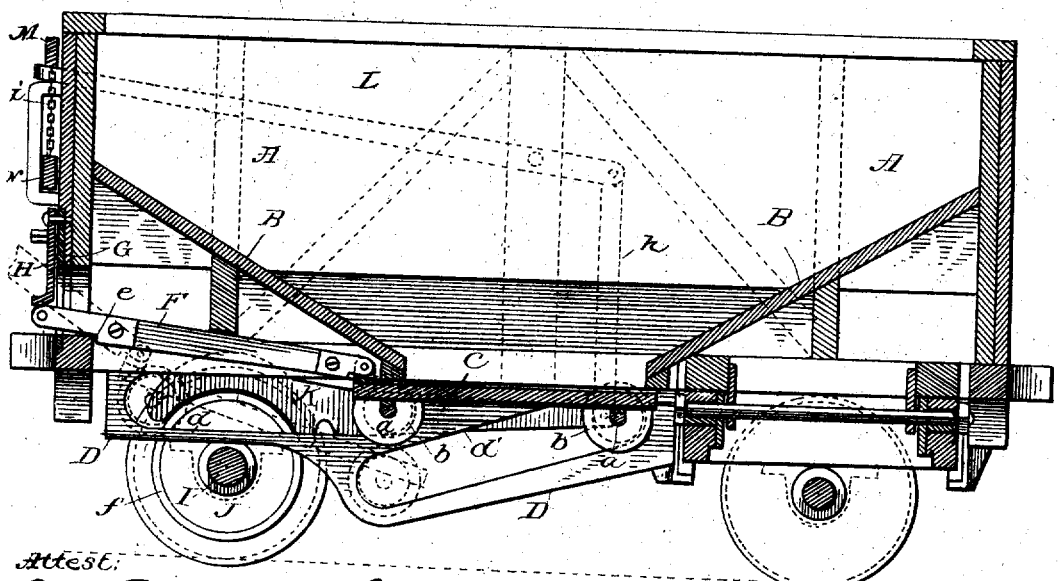
Figure 3:
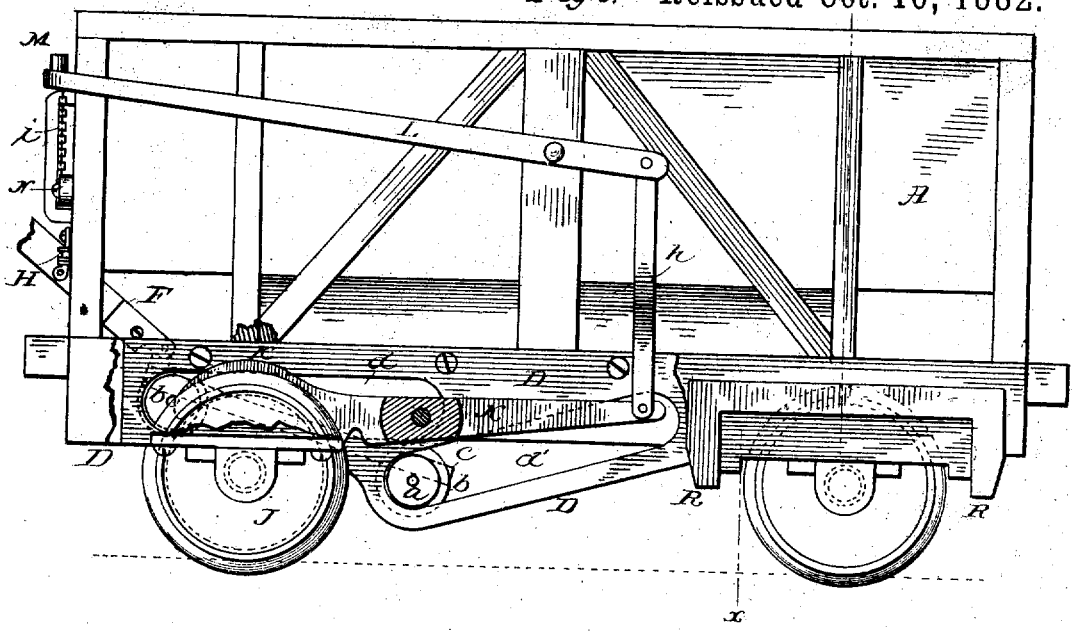
Figure 4:
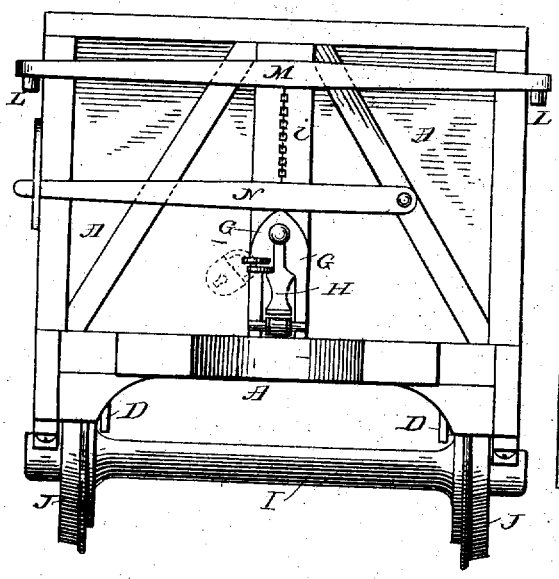
Figure 5:
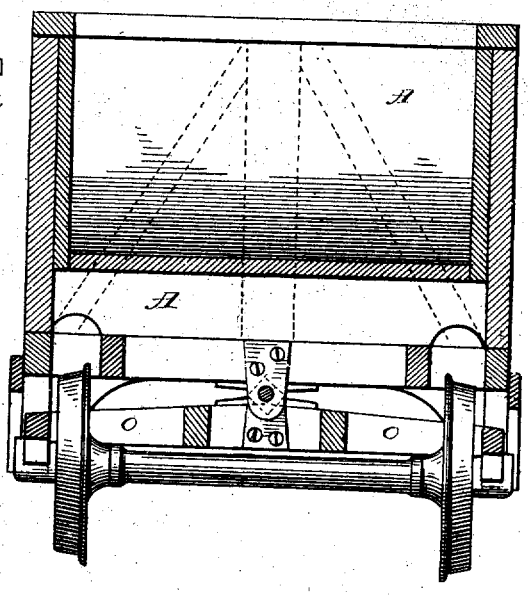

In the annexed drawings, which fully represent my invention, Figure 1 is a bottom view of a car embodying my invention. Fig. 2 is a central vertical section of the same on line *y y*, Fig. 1. Fig. 3 is a side elevation, partly in section. Fig. 4 is an end view, and Fig. 5 is a transverse vertical section on line *x x*, Fig. 3. The devices shown in Fig. 5 and on the right-hand end of Figs. 1, 2, and 3 relate to the car-truck and form part of Division B of this reissue.

A represents the body of a car to be used for coal or other material that may be emptied through the bottom. The interior of the car is constructed to form inclines B B from each end toward the center, and in the center of the car-bottom is a movable door, C. This door is provided with two shafts or axles, *a a*, each of which has on each end a flanged wheel or roller, *b*. Underneath the car are fixed, on each side, as shown in Figs. 1 and 2, slotted castings D D. The slots are shown in casting D on one side in Fig. 2. Slots *d'* are inclined and immediately underneath the opening, while slots *d* are horizontal and nearer the end of the car. The forward wheels, at the end of the door, as it moves, run on the inclined slots, and those at the rear end run in the horizontal slots. The inclines *d d* in these plates or castings are therefore arranged in such a manner that the inner end of the door will run down an incline while opening and the outer end will run nearly horizontal, so that the weight of the material in the car will cause the door to open as soon as it is unlatched.

At the outer end of the door C is hinged an arm, F, which passes through a casting or plate, G, at the end of the car, and this arm is formed with a shoulder, *e*, at such a point that when the door is closed the said shoulder will catch on the plate G or on the timbers of the car and hold the door closed. The arm is then locked in place by means of a latch, H, pivoted to the plate or casting G and dropping down over the end of the arm. The latch H may then be locked by means of any suitable lock, when the door cannot move out of place. However, when the latch H is raised and the arm F lifted up, the weight of the material in the car will cause the door to move on the incline and open to let out the material; or a slight pull on the arm F will start the door and cause it to move.

At one end of the car I use an axle, I, placed in bearings stationary with the car, and upon said axle are secured the wheels J J. Each wheel has on its inner side a flange, *f*, on top of which works a curved brake-lever, K. These brakes or brake-levers are pivoted to the body of the car and their ends connected with levers L L by means of straps or links *h*, the said levers L being pivoted one on each side of the car-body. The outer ends of the side levers L are connected by means of a cross-bar, M, which is by a chain, *i*, connected with the operating-lever N, as shown. This operating-lever is pivoted to the end of the car, so as to be easily accessible, and by the arrangement of the various parts a compound leverage is obtained, so that a slight movement of the operating-lever N will cause the brakes to exercise a powerful pressure on the inner flanges, *f*, of the wheels.

Having thus fully described my invention, what I claim as new, and desire to secure by Letters Patent, is—

1. In a dumping-car, a central sliding door, inclined ways, and a latching or locking device connected with the door, this said door being arranged to slide on an incline automatically by the weight of the coal or like load within the car when the latching device is released, substantially as herein set forth.

2. The combination of the door C, having shafts and rollers, as described, the slotted plates or castings D D, arm F, with shoulder *e*, and the slotted plate G, substantially as and for the purposes herein set forth.

3. The pivoted latch H, in combination with the plate G, shouldered arm F, and door C, substantially as and for the purposes herein set forth.

4. The combination of the brakes K, links *h*, levers L, with cross-bar M, chain *i*, and operating-lever N, with the wheels J, having inside flanges, *f*, substantially as and for the purposes herein set forth.

SIDNEY D. KING.

Witnesses:
G. S. FERRIS,
G. B. THOMPSON.